L. T. FREDERICK.
COVERING MATERIAL AND METHOD OF FORMING THE SAME.
APPLICATION FILED MAR. 13, 1918. RENEWED MAR. 8, 1922.

1,430,541.  Patented Oct. 3, 1922.

WITNESSES:
J. P. Wurmb.
W. H. Woodman

INVENTOR
Louis T. Frederick.
BY
Wesley G. Carr
ATTORNEY

Patented Oct. 3, 1922.

1,430,541

UNITED STATES PATENT OFFICE.

LOUIS T. FREDERICK, OF CHICAGO, ILLINOIS, ASSIGNOR TO WESTINGHOUSE ELECTRIC & MANUFACTURING COMPANY, A CORPORATION OF PENNSYLVANIA.

COVERING MATERIAL AND METHOD OF FORMING THE SAME.

Application filed March 12, 1918, Serial No. 222,162. Renewed March 8, 1922. Serial No. 542,165.

*To all whom it may concern:*

Be it known that I, LOUIS T. FREDERICK, a citizen of the United States, and a resident of Chicago, in the county of Cook and State of Illinois, have invented a new and useful Improvement in Covering Materials and Methods of Forming the Same, of which the following is a specification.

My invention relates to covering materials, the primary object of my invention being the provision of a covering material possessing unusual wear-resisting qualities, comparable with those of sole leather and, at the same time, possessing appreciable resiliency.

Another object of my invention resides in the provision of a covering material of this character which may be molded into desired shape, under heat and pressure, and which, in finished form, is unaffected by moisture, acids, oils and any but unusually high temperature.

Broadly speaking, my covering material is primarily intended as a covering for running boards of vehicles, floors of aeroplane bodies and corresponding parts where rubber matting is now commonly employed and also as a substitute for sole leather in the manufacture of foot wear.

Broadly, the covering material consists of a laminated body of fibrous sheet material and cork, both the sheet material and cork being impregnated with a suitable binder. Preferably, the fibrous sheet material consists of one or more layers of suitable fabric, such as duck, while the adhesive employed as a binder is preferably a phenolic condensation product, as the use of such product will render the resultant material substantially insoluble and infusible and capable of resisting moisture, acids, oils and heat. The cork employed may be in natural sheet form, but is generally ground into particles of a convenient size for mixing with a solution of the phenolic condensation product employed.

Figure 1:
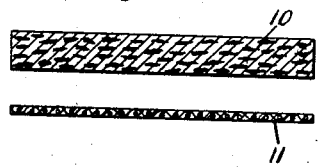
Figure 2:
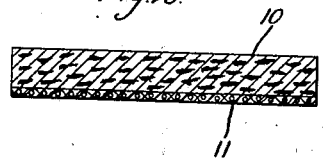
Figure 3:
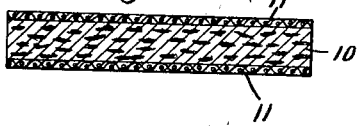
Figure 4:
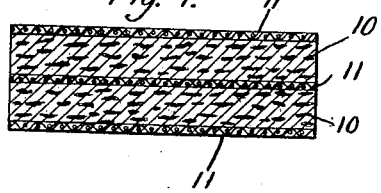
Figure 5:
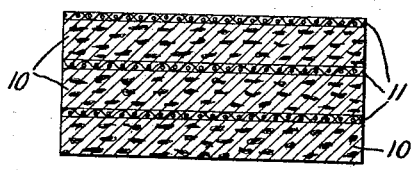
Figure 6:
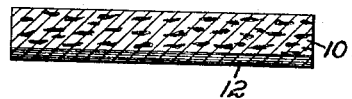

In the drawing, Fig. 1 is a sectional view of a layer of fabric and a layer of cloth in spaced superimposed relation, showing how the layers may be assembled; Fig. 2 is a sectional view of the final product which would be obtained by assembling the layers shown in Fig. 1 and subjecting them to heat and pressure; Figs. 3, 4 and 5 are sectional views showing various ways of combining laminations of fabric material with one or more lamentations of cork, while Fig. 6 is a section showing one manner of laminating fibrous sheet material, such as paper, with cork.

In Fig. 1 I have illustrated a layer of ground cork 10 which has been impregnated with a suitable adhesive, such as a solution of a phenolic condensation product, and which may be molded into sheet form with, or without, the employment of heat and pressure. If heat and pressure are employed, however, they are used only to such an extent as to shape the cork and not to such an extent as to change the phenolic condensation product to its final, hard and infusible form. A sheet of fibrous material 11, such as duck or other suitable fabric, is also impregnated with a suitable adhesive, preferably a phenolic condensation product, and the two are placed one upon the other and, when so assembled, are subjected to the combined action of heat and pressure to such an extent that the phenolic condensation product is first softened and then converted to its solid, substantially insoluble and infusible state. This hardening of the adhesive firmly joins the particles of cork to each other and to the fabric.

In Fig. 3 I have illustrated a modified form of wear-resisting material including an intermediate layer of cork 10 and surface layers of fabric 11, these several layers being impregnated with a phenolic condensation product, or other suitable binder, which has been reduced to solid form.

In Fig. 4 I have illustrated a still further form of material including an intermediate sheet 11 of fabric, sheets 10 of cork disposed upon opposite sides of the sheet 11, and additional sheets 11 of fabric disposed against the outer faces of the cork sheets. Again, in Fig. 5, I have shown a wear-resisting material comprising alternate sheets of cork 10 and fabric 11, an equal number of sheets of each type being employed so that one surface of the finished sheet material will consist of cork while the opposite surface will consist of fabric. The sheet materials shown in Figs. 4 and 5 are, of course, made in substantially the same manner as the various sheet materials previously described, a suitable adhesive, such as a phenolic condensation product, being employed as a binder for both the fabric and the cork.

In Fig. 6 I have illustrated a sheet of cork 10 molded upon a sheet 12 of fibrous, matted material, such as paper, the sheet of paper consisting of one or more thicknesses, as desired, and, of course, being impregnated with a suitable adhesive, such as a phenolic condensation product. Obviously, paper laminations may be employed, in place of the duck or fabric laminations, in any of the forms of sheet material shown in Figs. 1 to 5, my invention residing rather in the laminating of phenolic-condensation-product-impregnated sheets of cork with correspondingly impregnated sheets of reinforcing material, of which paper and woven fabric are examples.

Various degrees of density, resiliency and durability may be attained by varying the amount of impregnating material employed and the pressure to which the sheet material is subjected during its final heat treatment.

As a rule, the face of the sheet material which is to be exposed to wear is preferably of cork, as such face is somewhat softer and more resilient and has substantially the same wearing qualities as a woven fabric or paper face. For certain purposes, however, somewhat harder and smoother surfaces may be desired, in which case the woven fabric or paper surface will be exposed.

If any of the sheet materials above described are employed in the forming of soles and heels for foot wear, they may be molded to the desired shape and then secured to the shoe, in the manner in which heels and soles are ordinarily secured, or the sheet material may be molded directly upon the bottoms of shoes, ready to receive soles and heels, and then additionally secured to the shoes in the usual manner.

Although I have illustrated relatively few ways of combining sheet cork and another sheet material, such as woven fabric or paper, with a suitable binder, such as a phenolic condensation product, to provide a wear-resisting covering material, it will be appreciated that I reserve the right to make any sheet material, combining cork with any other sheet material by the use of any suitable adhesive, providing the resultant product comes within the scope of the claims.

I claim as my invention:

1. A covering material including cork impregnated with a phenolic condensation product which has been rendered hard and insoluble by the application of heat and pressure.

2. A covering material including a sheet comprising ground cork impregnated with a phenolic condensation product as a binder.

3. A covering material including layers of cork and fibrous sheet material associated with and impregnated by a phenolic condensation product which has been hardened by the application of heat and pressure.

4. A covering material including laminations of ground cork and fibrous sheet material associated with a phenolic condensation product as a binder.

5. A covering material including superimposed layers of ground cork and fabric, all impregnated with a phenolic condensation product which has been hardened and rendered substantially insoluble by the application of heat and pressure.

6. A covering material including ground cork compacted by associating it with a phenolic condensation product as a binder and subjecting it to the action of heat and pressure, and reinforcing means for the cork.

7. A covering material including a molded sheet of ground cork and a phenolic condensation product together with reinforcing sheets of fibrous material.

8. A method of forming a covering material that comprises impregnating sheets of fibrous material with a phenolic condensation product as a binder, impregnating ground cork with a phenolic condensation product as a binder, forming the cork so impregnated in sheets, associating sheets of the fabric with sheets of the cork and subjecting the body thus formed to the action of heat and pressure to reduce the phenolic condensation product to its final, solid and substantially insoluble state.

9. A method of forming a covering material that comprises associating layers of ground cork and sheets of fabric, all impregnated with a phenolic condensation product as a binder and subjecting the body so associated to the combined action of heat and pressure to harden the binder.

In testimony whereof, I have hereunto subscribed my name this 28th day of Feb., 1918.

LOUIS T. FREDERICK.